Feb. 2, 1932.  L. L. LEWIS  1,843,825
SWITCH CONTROL FOR LIGHT DIRECTION APPARATUS
Filed Jan. 15, 1930
FIG. 1.
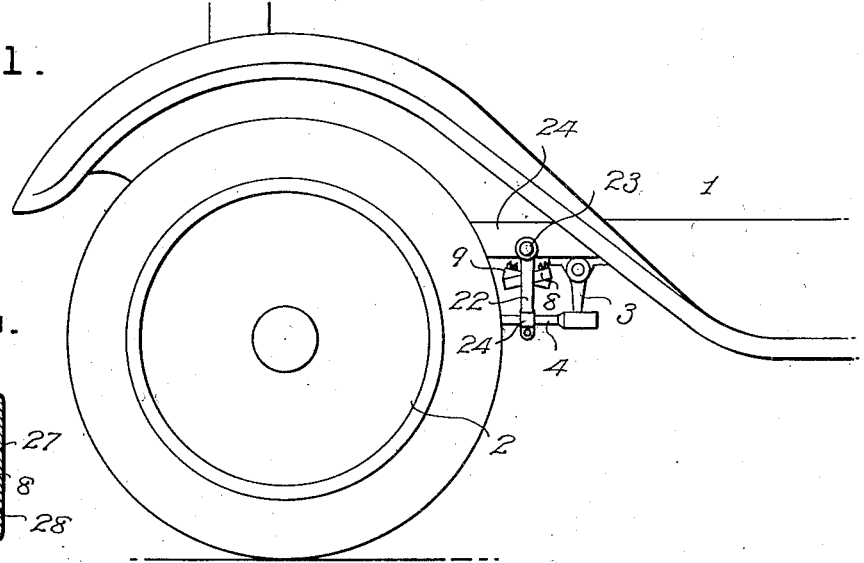
FIG. 3.
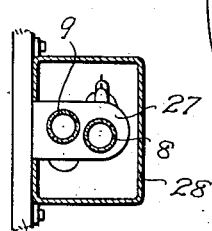
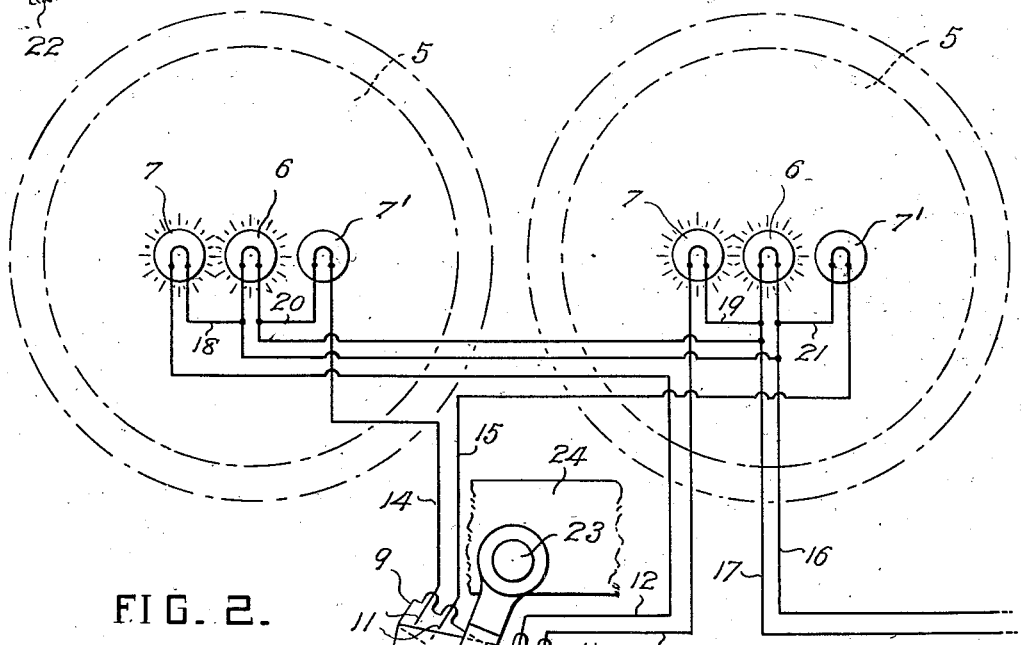
FIG. 2.
Inventor
LESTER L. LEWIS
By Edgar M. Kitchin,
his Attorney.

Patented Feb. 2, 1932

1,843,825

UNITED STATES PATENT OFFICE

LESTER L. LEWIS, OF NEW CASTLE, PENNSYLVANIA

SWITCH CONTROL FOR LIGHT DIRECTION APPARATUS

Application filed January 15, 1930. Serial No. 420,996.

This invention relates to improvements in apparatus designed for directing light rays according to and consistent with the direction of travel, and is especially well adapted for use on motor driven vehicles, such as automobiles, boats, and ships.

While the invention is applicable to any vehicle requiring light in advance to facilitate passing about a curve, for convenience of illustrative disclosure of the invention reference will be had to application of the invention to automobiles, and like land vehicles.

It has heretofore been proposed to employ a plurality of lights so arranged that rays of light will be projected in advance of the vehicle while moving substantially on a straight line with auxiliary lights for throwing rays laterally when the vehicle begins to round a curve. Mechanical apparatus have been proposed for turning on and off such auxiliary lights according to movements of the steering apparatus, and such proposed devices have heretofore employed mechanical switches of complicated and expensive construction and difficult of application and removal as well as requiring re-designing of the steering mechanism for such application. Furthermore, contact switches shifted to make and break positions by direct mechanical action of engaged parts of the steering mechanism have presented grave problems and difficulties in the encasing or hooding of the same against injury from impact of extraneous objects and the collection of dust and grit.

The essential object of the present invention is to overcome all of the defects and difficulties of such proposed devices, and to provide dependable and assured performance of light control apparatus by inexpensive and strikingly simple constructions entirely free from likelihood of injury either from impact or deposits of foreign substances.

With this and other objects in view as will in part hereinafter become apparent and in part be stated, the invention comprises control apparatus for lighting systems including a gravity-responsive switch and means for connecting such switch in position for being shifted by steering apparatus to and from a circuit-closing position.

In greater detail, the invention comprises the combination of a light circuit to be controlled, a sealed housing into which terminals of said circuit extend, a gravity-responsive switch movable within said housing to and from a circuit-closing position, and means for connecting the housing to an appropriate part of the steering mechanism for being shifted thereby to and from the circuit-closing position.

The invention comprises certain other novel constructions, combinations, and arrangements of parts as will be subsequently specified and claimed.

In the accompanying drawings,—

Figure 1 is a fragmentary, side elevation of a motor vehicle provided with an embodiment of the present invention.

Figure 2 is a view partly in fragmentary, side elevation and partly in diagram illustrating the invention, including the circuits and light, the shielding casing being omitted from the switch housings, and the lights being shown as if observed from a plane in the front.

Figure 3 is a detailed, cross section through the gravity-responsive switches and their protecting casing.

Referring to the drawings by numerals, 1 indicates any appropriate vehicle, such as an automobile, truck, tractor, or the like, having the customary chain of steering gearing for shifting the guiding wheels or front wheels 2 of the vehicle in the usual and well known manner. The said chain of steering gearing includes the usual crank arm 3 and steering link 4 connected in the well known manner for changing the course of the wheel 2 for causing the vehicle to take a curved path or to return to a rectilinear path.

The vehicle 1 is provided with headlights or headlight housings indicated diagrammatically at 5, 5, in Figure 2, each of which is provided with the central bulb 6 and with laterally located bulbs 7 and 7'. The bulbs 6, 7, and 7' of each headlight 5 are arranged in proper relation to the usual and customary parabolic reflector, so that the bulb 6 will have its rays generally projected on a straight line of advance, while the bulbs 7 will have their rays projected laterally toward the left, and the bulbs 7' will have their rays projected laterally toward the right. Thus, during operation, when the vehicle is moving substantially on a straight line, bulb 6 alone will be lighted, but, when the vehicle begins to move about a curve to the right, the bulbs 7' will be lighted for illuminating the roadway at the right and about the inside of the curve, the bulbs 7 remaining unlighted. When the vehicle straightens up to a rectilinear course again, the lighted bulbs 7' will become extinguished, and, when the vehicle begins to turn to the left, the bulbs 7 will automatically become illuminated. In the practicing of the present invention, the lighting and extinguishing of the bulbs 7 and 7' occur incident to movements of the vehicle without the necessity for any manipulation of switches by the operator.

According to the specific embodiment illustrated in the accompanying drawings, the present invention includes the employment of two tubular housings, one designated by the reference numeral 8, and the other by the reference numeral 9. Each housing 8 and 9 is preferably hermetically sealed glass with the air exhausted, and contains a gravity-responsive switch. Such switch may, of course, assume various forms so long as a substance, object or body is movably arranged within the sealed housing to move by gravity to and from a switch-closing position. A very inexpensive and at the same time dependable and durable form of switch consists of a body of mercury 10, which is located within the respective housings 8 and 9 to at times contact with terminals 11, 11, projecting into the housings from lead wires. One of the terminals 11 of housing 8 connects with a lead wire 12 and the other terminal 11 connects with a lead wire 13, while one terminal 11 in housing 9 connects with a lead wire 14 and the other terminal 11 connected with a lead wire 15. Main leads 16 and 17 extend from the customary or any available source of current, such as a battery or generator, to the bulbs 6 and are connected in multiple therewith, as illustrated and in conformity with the usual and conventional method of hooking up headlights of a vehicle. Of course, an appropriate, manually-controlled switch, not illustrated, will be located in one of the lines 16 or 17. As all current for the bulbs 7 and 7' is drawn from the lines 16 and 17, all bulbs within lights 5 are adapted to be extinguished by the opening of the circuit 16, 17. Line 12 extends from terminal 11 to one side of the bulb 7 in one light, and line 13 extends from its terminal 11 to the corresponding side of the bulb 7 in the other light. The other side of bulb 7 of the righthand light is connected by a short line 18 with line 16, while the corresponding side of the other bulb 7, is connected by a short line 19 with the line 17, so that, when the terminals 11 of lines 12 and 13 are connected by the mercury switch 10, the bulbs 7 are connected in series with each other and in multiple with bulb 6 and are thereby lighted.

On the other hand, the hook-up of the bulbs 7' corresponds with that just described, consisting of wire 14 leading from one of the terminals 11 of housing 9 to one side of the bulb 7' in the righthand light 5, the other side of said bulb 7' being connected by a short line 20 to line 17. The wire 15 leading from the other terminal 11 of housing 9 extends to one side of the bulb 7' of the lefthand light 5, the other side of the said bulb 7' being connected by a short line 21 to the line 16, so that, when the gravity-responsive switch or mercury 10 of housing 9 causes contact of the terminals 11 within housing 9, the bulbs 7' are connected in series with each other and in multiple with bulbs 6, and are thereby lighted. Obviously, any workable hook-up may be substituted for that described so long as proper connections are made for the responsive action accomplished by the present invention.

The housings 8 and 9 may be located or connected in any of numerous ways and positions to any appropriate part of the chain of steering gearing so long as connected in a manner to be positively shifted to the positions for accomplishing the results now to be stated. A very successful and acceptable connection is illustrated and consists of a link 22 pivoted at 23 at its upper end to the frame 24, or any other appropriate parts of the vehicle 1. The link 22 would normally hang pendent and swing freely on its pivotal connection 23, but to afford the desired action, a pin and slot connection is provided between the link 22 and the steering link 4, which pin and slot connection may take any of numerous well known forms, as, for example, the provision of a sleeve 24 detachably clamped to the steering link 4 and provided with a pin 25 extending through a slot 26 formed longitudinally in the link 22, whereby longitudinally shifting of link 4 will cause the link 22 to swing upon its pivot. The parts are located relative to each other such that when the vehicle 1 is advancing on a substantially straight line, the link 22 will be in substantially the vertical position illustrated in Figure 1 of the drawings, and, when the wheels 2 are turned to cause the vehicle to move toward the left, the link will be inclined forwardly, as seen in Figure 2. Likewise, when the wheels 2 are turned to cause the vehicle to turn toward the right, the link 22 will be inclined toward the rear to the same extent as it is shown toward the front in Figure 2.

The housings 8 and 9 are clamped together and clamped to the link 22 by an appropriate retainer 27, the housings 8 and 9 being so located relative to each other as held by said retainer 27 that, when the link 22 is in its vertical position as seen in Figure 1, the housing 8 will have an inclination toward the front, while the housing 9 will have an inclination toward the rear. It is observed that the terminals 11 are at the rear portion of housing 8 and at the front portion of housing 9, so that gravity-responsive switches 10 will be held by gravity out of contact with the respective terminals when the parts are in the position shown in Figure 1.

However, when the vehicle starts to turn on a curve, as, for instance, turning to the left as indicated in Figure 2, the swing of the link 22 causes the housing 8 to move from its forwardly inclined position to the inclined position seen in Figure 2, which enables the gravity-responsive switch 10 to move by gravity to the circuit-closing position of Figure 2. The movement of the housing 9, however, incident to the forward swing of link 22, is only such as to increase its inclination, so that the terminals 11 of housing 9 are left out of contact. Thus, with the shifting of the guiding wheels 2 to the position for passing about a curve to the left, the bulbs 7 will be illuminated and rays of light will accordingly be projected toward the left side of the vehicle and facilitate observation of conditions about the curve. The converse action occurs when the guiding wheels 2 are shifted by link 4 to the position for passing about a curve to the right, whereby the rays are projected toward the right side of the vehicle, and it is observed that, when the rays are being projected laterally according to the direction of the curve, the opposing bulbs 7 or 7′ remain unlighted.

While the housing 8 and 9 are preferably in the form of glass vacuum tubes containing mercury, that are, of course, susceptible of a wide range of modification in detailed construction, and are at all events preferably carefully shielded against injury by impact from the exterior. The shield may assume any of various, convenient forms, one of which only is shown in the nature of a metallic casing 28, which is preferably constructed to be readily detachable but to be rigidly anchored to the link 22 so as to insure service as an effective shield.

Among various obvious advantages and objects of the present invention is the fact that no amount of steering movement can result in defective operation. So long as the steering movement advances in one direction just that long the proper switch will maintain closed the proper circuit for the right lateral light projection, and no amount of turning of the steering wheel will vary this condition. As soon, however, as the vehicle returns to a condition of straight advance or starts to curve in the opposite direction, the reversal of the light-controlling, gravity switches will occur, and again the proper light distribution will be automatically effected.

It is, of course, desirable that the housings 8 and 9 shall be assembled as a unit both to avoid multiplicity of parts and to provide ease of attachment to vehicles. Obviously, the present invention adapted itself readily to vehicles already in use. The housings 8 and 9, however, are only bound together as a unit for convenience and may be separated and spaced apart any desired distance, even to appearing at opposite sides of an automobile when preferred, as, for example, when applied to a vehicle having a plurality of steering links corresponding to link 4.

What is claimed is:—

1. In vehicle light-control apparatus for vehicles having steering means and a headlight housing, the combination, with an element pivotally carried by the vehicle to swing vertically in the direction of the normal rectilinear path of advance of the vehicle, said swinging element being connected to be swung by the steering means, of a light for projecting rays from the headlight housing at one side, a second light for projecting rays from the headlight housing at the other side, circuits for the lights, and gravity-responsive switch tubes for said circuits for opening and closing the circuits according to the positions of the tubes, the said tubes being carried by the swinging element with the longitudinal axes of the tubes extending in the general direction of advance of the vehicle, one of the tubes being disposed with respect to the swinging element for being pitched forwardly and the other of the tubes pitched rearwardly when the swinging element is in a vertical position, the pitch of said tubes being at a degree sufficiently low to enable the tubes to be moved with the swinging of the swinging element to opposing positions of inclination, and each of the tubes containing a gravity-responsive switch movable within the tubes in the direction of the length thereof.

2. The combination as claimed in claim 1 wherein the tubes are assembled in the same transverse planes of the swinging element and are thereby crossed with respect to each other.

3. The combination as claimed in claim 1 wherein the tubes are of insulating material and the contained switches are bodies of liquid electrical conductors.

In testimony whereof I affix my signature.

LESTER L. LEWIS.